Patented Jan. 25, 1944

2,339,768

UNITED STATES PATENT OFFICE 2,339,768

SYNTHETIC CONDENSATION PRODUCT

Gaetano F. D'Alelio, Pittsfield, Mass., assignor to General Electric Company, a corporation of New York No Drawing. Application August 30, 1941,
Serial No. 409,018

3 Claims. (Cl. 260—42)

This invention is concerned with the production of new and useful synthetic condensation products. More particularly, it relates to synthetic products derived from novel starting materials containing amino, amido, and imino linkages. Specifically, it is concerned with and has as its principal object the preparation of resinous compositions obtained by condensation reactions involving certain novel starting materials hereinafter broadly referred to as tri-(carbinolureidomethyl) amines, including substituted tri-(monocarbinolureidomethyl) amines and substituted and unsubstituted tri-(monocarbinolthioureidomethyl) amines, of the general formula:

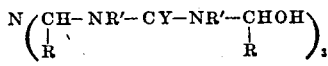

wherein Y represents oxygen or sulphur, R represents hydrogen or a monovalent aliphatic, carbocyclic or aromatic hydrocarbon radical of not more than six carbon atoms, R' represents hydrogen or any monovalent hydrocarbon or halohydrocarbon radical, whether saturated or unsaturated, aliphatic, alicyclic, aromatic or heterocyclic, mono- or poly-nuclear, etc.

A further object of the invention is to provide materials which may be incorporated into and reacted with other resins and resin-forming materials. Another object of this invention is to provide a class of organic compounds which may be used as catalytic reactants in the preparation of resins depending on condensation reactions, or as curing reactants for resins obtained through condensation reactions. Still other objects of the invention will appear as the description of the invention proceeds.

The novel preformed starting materials which are also tri-monocarbinolureido derivatives of trimethyl amine and which contain both carbinol (—CHROH) and ureido (NR'CONR'—) or thioureido (—NR'—CS—NR'—) groupings may suitably be prepared by reacting, in the cold, a concentrated aqueous solution of 1 mol of ammonia with a concentrated solution of 3 mols of a preformed di-(N-carbinol) urea, which term is intended to cover the simple dicarbinol derivatives of urea, such as dimethylol urea and also the dicarbinol derivatives or substituted dicarbinol derivatives of urea and thiourea, or substituted ureas and thioureas represented by the formula

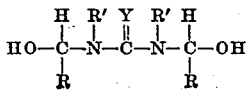

wherein, as previously indicated, Y represents oxygen or sulphur, R represents hydrogen or a monovalent aliphatic carbocyclic or aromatic hydrocarbon radical of not more than 6 carbon atoms, and R' represents hydrogen or any monovalent hydrocarbon radical, examples of which are aliphatic (e. g. methyl, ethyl, propyl, isopropyl, butyl, secondary butyl, isobutyl, butenyl, amyl, isoamyl, hexyl, allyl, etc.) including cycloaliphatic (e. g. cyclopentyl, cyclopentenyl, cyclohexyl, cyclohexenyl, cycloheptyl, etc.); aryl (e. g. phenyl, diphenyl, naphthyl, etc.); alkaryl (e. g. tolyl, xylyl, ethylphenyl, propylphenyl, isopropylphenyl, etc.); aralkyl (e. g. benzyl, phenylethyl, phenylpropyl, etc.); and their homologues, as well as those groups with one or more of their hydrogen atoms substituted by a halogen. Specific examples of halogeno-substituted hydrocarbon radicals are chlorcyclohexyl, chlorphenyl, dichlorphenyl, ethyl chlorphenyl, phenyl chlorethyl, bromethyl, bromtolyl, etc.

Examples of di-(N-carbinol) ureas other than dimethylol urea previously mentioned are: dimethylol thiourea, methylol methylcarbinol urea and thiourea, di-methylcarbinol urea and thiourea, di-propylcarbinol urea and thiourea, dimethylol phenyl urea and thiourea, dimethylol allyl urea and thiourea, etc.

Preferably the novel tri-(carbinolureidomethyl) derivatives of ammonia are prepared by slowly adding a cold concentrated aqueous solution of ammonia to a cold concentrated aqueous solution of the desired di-(N-carbinol) urea in the ratio of 1 mol ammonia to 3 mols of the dicarbinol urea at a temperature between 0° and —20° centigrade. The mixture is held within this temperature range during the course of the condensation reaction in which the two ingredients react as follows:

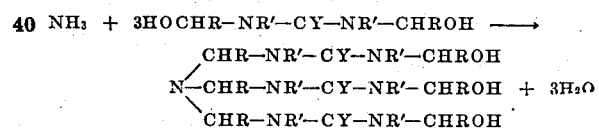

Thus one mol of ammonia reacts with three mols of dimethylol urea to form the simplest tri-carbinolureidomethyl derivative, tri-(monocarbinolureidomethyl) amine, having the formula

The product of this reaction may be recovered by evaporation of the water at or below room temperature under atmospheric or subatmospheric pressures. Alternatively, the product may be recovered by adding to the aqueous solution of the reaction product a suitable water-miscible precipitant for the reaction product, which precipitant is incapable of reacting with the desired product at operating temperatures.

The compounds of the general formula

$$N(CHR-NR'-CY-NR'-CHROH)_3$$

may be resinified under the influence of heat, the compound $N(CH_2NHCONHCH_2OH)_3$ being most readily resinified under such conditions. The relative ease of resinification decreases with increased substitution of the various substitutable hydrogens by hydrocarbon radicals. Resinification may be accomplished by heating the compound alone, in an inert medium, or in an inert solvent such as water. Resinification may be accelerated by the addition or presence of basic materials, acidic materials, neutral, acid, or alkaline salts. Reactive media may likewise be used to achieve resinification as hereinafter shown.

These novel compounds may also be used as reactant catalysts in the preparation of synthetic resins from aldehyde and other aldehyde reactable organic compounds, e. g. in the condensation of urea-formaldehyde, thiourea-formaldehyde, melamine-aldehyde, aminopyrimidine-aldehyde, guanazole-aldehyde, protein-aldehyde, phenol-formaldehyde, etc. By a reactant catalyst is meant a substance which will accelerate the condensation between the aldehyde and the aldehyde reactable body during the preparation of the resin while it itself becomes part of the resin. Since these compounds become part of the resins, the final resins strictly may be called aminoplasts.

Being bases, the novel compounds form salts with inorganic and organic acids such as hydrochloric, sulfuric, nitric, hydrofluoric, carbonic, formic, acetic, propionic, butyric, chloracetic, dichoracetic, benzoic, phthalic, cyclohexyl, carboxylic, oxalic, malonic, succinic, adipic, maleic, fumaric, citraconic, acrylic, methacrylic, atropic, polyacrylic, polymethacrylic acids, etc. These salts are extremely valuable in accelerating the conversion of the base compound

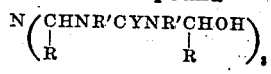

$$N\begin{pmatrix} CHNR'CYNR'CHOH \\ | \qquad\qquad | \\ R \qquad\qquad R \end{pmatrix}_3$$

to a resinous state and may also be used as curing reactants for aminoplast and other resins such as urea-aldehyde resins, aminotriazine-aldehyde resins, etc. By a curing reactant is meant a compound which causes the curing or accelerates the curing of a resin and at the same time becomes an integral part of the resin.

The novel class of crystalline preformed organic compounds may be mixed with resin intermediates containing carbinol (—CR$_2$OH) groups, such as monomethylol ureas, dimethylol ureas, phenol methylols, the methylols of cyclic amidines, e. g., melamine methylols, aminopyrimidine methylols, guanazole methylols, etc., then co- or inter-resinified alone or in the presence of other modifying bodies to give intercondensed resins.

The novel compounds of this invention, particularly the highly substituted compounds, may be used as plasticizers for many resins. In many cases they themselves become resinous during the plasticizing process, while in other cases they condense with the other resinous intermediates during manufacturing operations. Specifically, these materials may be used (1) unconverted as plasticizers, (2) partly or completely converted as plasticizers, (3) partly or completely intercondensed to exert a plasticizing effect. The final and intermediate resins prepared from the novel materials of this invention alone or with the modifications expressed herein are extremely compatible with many other natural or synthetic resins in their intermediate or ultimate stages.

The novel base materials of this invention may also be used to peptize or swell proteins, shellac, acid alkyd resins, etc., bring them into solutions, or dispersions, or emulsions, or gels. Such composition may be "hardened" with or without the addition of aldehydes.

The compounds, alone or under catalytic influences as above expressed, will condense with many classes of compounds which form methylols and substituted methylols with formaldehyde, its polymers and homologues, for example with hydroxy compounds, e. g. methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1-chlorallyl, propargyl, 2-chlorallyl, cinnamyl alcohols, etc., glycol, diethylene glycol, triethylene glycol, polyethylene oxide, glycerine, pentaerthritol, saligenin, phenol, cresol, xylenol, resorcinol, catechol, pyrogallol, etc.; chlorohydrin, epichlorohydrin, nitrobutanol, diacetone alcohol, ethylene oxide, propylene oxide, etc.; ammonia and its amino, amido, or imino compounds, e. g. methylamine, dimethylamine, hydroxylamine, hydrazine, phenyl hydrazine, diamylamine, stearyl amine, cyclohexyl amine, aniline, diphenylamine, diaminobenzene, triaminobenzene, aminophenol, nitro aniline, piperazine, ethanolamine, di-isopropanolamine, triethanolamine, propalolamine, ethylene diamine, formamide, acetamide, propionamide, lauramide, acrylic amide, methacrylic amide, succinic diamide, citraconic triamide, benzamide, phthalic diamide, phthalimide, benzoyl sulfinimide, benzoyl sulfonylimide, aminobenzene sulfonylamide, benzene disulfonylamide, benzene trisulfonylamide, anthranilic esters, anthranilamide, salicylamide, para-phenyl benzene sulfonylamide, tolyl amide, etc.; cyclic amidines such as the amino 1,3,5 triazines, e. g. 2,4,6 triamino 1,3,5-triazine, 2-amino-1,3,5-triazine, 2,4-diamino-1,3,5-triazine; the diazines, e. g. 2,4,6 triamino-pyrimidine, the diamino pyrimidine thio ethers; the amino-1,2,4-triazoles, e. g. guanazole, phenyl guanazole, dihydrazamido-1,2,4 pyrrodiazole, the amino 1,2 diazoles, e. g. 3,5 diaminopyrazole, guanazo-guanazole, imidurazo-guanazole, the urea type compounds, e. g. urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, di-cyandiamide, guanyl urea, guanyl thiourea, the proteins, e. g. casein, soya bean protein, alfalfa protein, gelatin, coffee bean protein, alkyd resins having free hydroxyl groups such as glyceryl phthalate, oil-modified glyceryl phthalate, diethylene glycol succinate, triethylene glycol maleate, glyceryl maleate, etc.; nitriles, e. g. acetonitrile, propionitrile, butyronitrile, benzonitrile, acrylonitrile, methacrylonitrile, atropic nitrile, ethylene cyanohydrin, acetone cyanahydrin, amino-isobutyronitrile, aminoacetonitrile, etc.; esters such as lactic esters, hydroxy isobutyric esters, acetoacetic ester, malonic esters, etc.

The novel compounds of this invention, alone or modified, will also form self-curing aminoplasts by condensation with curing reactants such as chloracetonitrile, nitrourea, glycine, amino propanol hydrochloride, alpha beta dibrompropionitrile, mono-, di- or tri-chloracetamides, aminoacetamide hydrochloride, ethylene diamine monohydrochloride, sulfamic acid, chloracetyl urea, citric diamide, phenacyl chloride and others mentioned, for example, in my copending applications Serial No. 346,962, filed July 23, 1940, and Serial No. 354,395, filed August 27, 1940, both of which applications are assigned to the same assignee as the present invention.

The various ways in which my novel compounds may be used with or without the addition of various modifiers, in the preparation of resinous compositions will become apparent from the following examples illustrating how the principles of this invention are carried into effect.

Example 1

A 23% aqueous solution of the compound $N(CH_2-NH-CO-NH-CH_2OH)_3$ was evaporated to dryness by heating at a temperature of 100° C. The product obtained at this elevated temperature was a clear, colorless resin. The softening point of the resin was advanced by heating at 125° C.

Example 2

A solution of $N(CH_2NHCONHCH_2OH)_3$ was treated with various amounts of hydrochloric acid to produce $HCl \cdot N(CH_2NHCONHCH_2OH)_3$ alone or in excess acid or mixtures of $$N(CH_2NHCONHCH_2OH)_3$$

and $HCl \cdot N(CH_2NHCONHCH_2OH)_3$. On evaporating these mixtures and heating the residue at 100° C.–150° C. clear, colorless, hard, infusible resins were obtained.

Example 3

| | Parts by weight |
|---|---|
| Urea | 60 |
| Aq. formaldehyde (approx. 37.1% $CH_2O$) | 160 |
| $N(CH_2NHCONHCH_2OH)_3$ | 1.2 | were mixed and heated under reflux at the boiling point of the mass. A clear, colorless resin was precipitated that cured quickly to an infusible mass at 130° C.

Example 4

| | Parts by weight |
|---|---|
| Urea | 60 |
| Aq. formaldehyde (approx. 37.1% $CH_2O$) | 160 |
| $N(CH_2NHCONHCH_2OH)_3$ | 6 | were mixed and refluxed for 30 minutes at the end of which time a clear syrup having a pH of 3.58 was obtained. When tested on the hot plate at 130° C. a sample of the resin had an excellent cure. The syrup was converted to a molding compound by heating 23 parts by weight thereof with 0.05 parts chloroacetamide under reflux for 10 minutes, and then mixed the product with 7 parts alpha flock and 0.04 part zinc stearate. The resulting wet compound was dried at 70° C. for 3 hours. A very well-cured light-colored piece was obtained by molding the dried compound for five minutes at 130° C. under a pressure of 2000 pounds per square inch.

Example 5

| | Parts by weight |
|---|---|
| Dimethylol urea | 30 |
| $N(CH_2NHCONHCH_2OH)_3$  | 3 | were dissolved together in 35 parts of water and heated under reflux for 30 minutes. A clear syrup was obtained. The addition of intercondensing agents, as chloroacetamide, glycine, nitro urea, alpha-B-propionitrile, etc. or acids as citric and polysalicylic, to this syrup produced good self-curing resinous materials.

Two molding compounds were made from the above syrup, as follows:

| | Parts by weight |
|---|---|
| (A) Syrup | 23 |
| Chloroacetamide | 0.1 |
| (B) Syrup | 23 |
| Glycine | 0.1 |

In each instance the components were heated under reflux for 10 minutes and 7 parts alpha flock and 0.04 part zinc stearate were added thereto. The compounds were dried at 70° C. for three hours. Both compounds gave well-cured light-colored pieces when molded at 130° C. and a pressure of 2000 pounds per square inch.

Example 6

| | Parts by weight |
|---|---|
| Aqueous $N(CH_2NHCONHCH_2OH)_3$ (23% conc.) | 22 |
| Aqueous melamine trimethylol (50% conc.) | 10 | were mixed and refluxed for 10 minutes. At the end of the reflux the solution was absolutely clear and had a pH of 8.1. The resin was self-curing but its cure could be accelerated by the addition of curing reactants and acids, such as chloracetamide, citric and lactic acids, etc. A molding compound was made by adding to 30 parts of the syrup 7 parts of alpha flock and 0.04 part zinc stearate. The compound was dried at 70° C. for five hours. It produced a well-cured piece possessing excellent water-resistance when molded at 130° C.

Example 7

| | Parts by weight |
|---|---|
| Aqueous $N(CH_2NHCONHCH_2OH)_3$ (23% conc.) | 160 |
| Glycerine | 6 | were mixed and refluxed for 30 minutes to a pH of 7.65. Upon evaporation of the product, a clear, colorless, tough thermoplastic resin was obtained. When acidified, for example with a small amount of phthalic acid, or intercondensed with the curing reactants previously mentioned, as for example chloroacetamide, etc. a resin having a very hard cure was obtained.

Example 8

| | Parts by weight |
|---|---|
| Butyl alcohol | 45 |
| $N(CH_2NHCONHCH_2OH)_3$ in 1 part water | 36.8 | were mixed and refluxed for one hour. When the resulting syrup was concentrated a transparent thermoplastic resin that could be hardened by the addition of suitable agents was obtained.

Example 9

| | Parts by weight |
|---|---|
| $N(CH_2NHCONHCH_2OH)_3$ in 1 part water | 36.8 |
| Diethyl malonate | 20.0 |
| NaOH in 0.5 part water | 0.1 | were heated together under reflux for one hour. The solution was evaporated at 100° C. to a clear, resinous, viscous mass which was bodied to a clear resin which hardened on cooling. The product was soluble in alcohol.

Example 10

| | Parts by weight |
|---|---|
| Aqueous $N(CH_2NHCONHCH_2OH)_3$ (23% conc.) | 160 |
| Acetamide | 7.4 | were mixed and refluxed for 30 minutes. The resulting solution having a pH of 6.8 was concentrated to a clear resin which bodied when heated to 125° C. When the resin was acidified, or condensed with curing reactants, self-curing resins were obtained. This intercondensation product is an excellent plasticizer for the general class of aminoplast resins.

Example 11

| | Parts by weight |
|---|---|
| Melamine | 6.3 |
| Aq. formaldehyde (approx. 37.1% CH₂O) | 12 |
| Aqueous N(CH₂NHCONHCH₂OH)₃ (23% conc.) | 4 | were mixed and refluxed for 15 minutes. The pH of the syrup was 7.92. A curing resin was obtained by evaporating the syrup at 125° C. A molding compound was produced by mixing with 23 parts of the syrup 7 parts alpha flock and 0.04 part zinc stearate. This compound was dried at 70° C. for 5 hours. A well-cured piece was obtained by molding at 130° C. If desired, the cure may be accelerated by incorporating acids, latent catalysts, or curing reactants into the syrup prior to the introduction of the filler.

Example 12

22 parts of a 23% aqueous solution of

N(CH₂NHCONHCH₂OH)₃ were heated under reflux for 30 minutes. 5 parts of trimethylol melamine in 5 parts water were added and the reflux continued for an additional 20 minutes. An insoluble resin precipitated at the end of 5 minutes. At the end of the 20 minutes, the product has a pH of 7.5 and could be cured by heat to the insoluble infusible state without the addition of agents of any kind.

Example 13

| | Parts by weight |
|---|---|
| N(CH₂NHCONHCH₂OH)₃ | 23 |
| Shellac | 1 | were mixed in 77 parts water and heated to boiling to obtain a solution. On evaporation of the water at 100°–125° C. an infusible resin film was obtained. Similar infusible films or products are obtained on dry mixing and heating the ingredients.

Example 14

A phenol-aldehyde varnish was compounded in the following manner:

| | Parts by weight |
|---|---|
| Phenol—82% (12% ortho cresol) | 180 |
| Aq. formaldehyde (approx. 37.1% CH₂O) | 216 |
| Na₂CO₃·H₂O in 4.15 parts water | 1.8 | were mixed and refluxed for 30 minutes to produce a resinous solution having a hot-plate cure at about 150° C. of 85 seconds. The resin solid content of this varnish was 53% and the pH was 8.8. The addition of 23 parts by weight of a 23% solution of the compound

N(CH₂NHCONHCH₂OH)₃ to 10 parts by weight of this varnish, followed by refluxing for 10 minutes, produced a resin which had a longer plastic flow and elasticity than the original phenol-aldehyde varnish. Portions of the phenol-aldehyde varnish and the 23% aqueous solution of the compound

N(CH₂NHCONHCH₂OH)₃ were mixed in the ratios of 1:9 and 9:1 based on the solid contents of the respective ingredients. Both of the resulting products had a cure time of 75 seconds or less when tested on the hot-plate at 160° C. as compared with 85 seconds for the phenol-aldehyde varnish itself.

Example 15

Example 14 was repeated, using instead of the phenol-aldehyde varnish a substantialy anhydrous liquid phenol-aldehyde resin freed from catalyzing bases and salts. The results obtained were similar to those of Example 14. Before reaction with N(CH₂NHCONHCH₂OH)₃ the catalyst-free resin had a cure of 135 seconds at 160° C. and after condensation therewith, its cure was accelerated to 110 seconds.

Example 16

A urea-formaldehyde resin varnish was prepared as follows:

| | Parts by weight |
|---|---|
| Urea | 60 |
| Aq. formaldehyde (approx. 37.1% CH₂O) | 161 |
| Aqueous NH₃ (28%) | 6 |
| NaOH in 5 parts water | 0.1 | were mixed and refluxed for 30 minutes.

To 20 parts of this varnish solution there were added 8 parts of a 23% water of

N(CH₂NHCONHCH₂OH)₃ and the reflux continued for 30 minutes at the end of which time the product had a pH of 7.3. To 23 parts of the product was added 0.1 part of chloroacetamide, and the mixture refluxed for 10 minutes. After the addition of 7 parts of alpha flock and 0.04 part zinc stearate were added, the compound was dried at 70° C. for 4 hours and molded at 130° C. to produce a well-cured molded article.

Example 17

As examples of typical potential self-curing aminoplasts, the compound

N(CH₂NHCONHCH₂OH)₃ in water solution, was condensed by refluxing with small quantities of curing reactants and tested on the hot-plate at 130°–150° C. to note the curing effects. Chloroacetamide, nitrourea, glycine, trichloracetamide, phenacyl chloride, alpha-beta dibromopropionitrile, chloracetonitrile, chloral urea, sulfamic acid, citric acid diamide, and polysalicylide were observed to produce self-curing aminoplasts.

Example 18

| | Parts by weight |
|---|---|
| HCl·N(CH₂NHCONHCH₂OH)₃ | 0.4 |
| Urea varnish of Example 16 | 23 | were mixed to give a syrup with a pH of 6.2. This mixture produced a resin that cured at 140° C. without the benefit of any added agent. The mixture was converted into a molding compound by the addition to 23 parts of the syrup of 7 parts alpha flock and 0.04 part zinc stearate. The compound was dried at 70° C. for 5 hours and molded at 130° C. to form a very well-cured piece.

Example 19

| | Parts by weight |
|---|---|
| Aqueous N(CH₂NHCONHCH₂OH)₃ (23% conc.) | 28 |
| Polyvinyl alcohol | 5.3 | were mixed and heated under reflux for 15 minutes. There was produced a clear, viscous syrup with a pH of 8.0. By controlling the pH of this resin its curing characteristics could be controlled. Either thermoplastic or thermosetting products may be obtained. Films of the cured resin are perfectly transparent and possess a remarkable degree of toughness. The resin may be used in the manufacture of cast resin products.

In producing these various condensation products dyes, pigments, plasticizer, mold lubricants, opacifiers, and various fillers (e. g. wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as has been shown as modifiers of other natural and synthetic resins, as laminating varnishes in the production of laminated articles wherein sheet materials, e. g. paper, cloth, sheet asbestos, etc. are coated and impregnated with the resin, superimposed and thereafter united under heat and pressure. They may also be used as modifiers of, or may be modified by, the synthetic compositions disclosed in various copending applications of mine, for example in copending applications Serial Nos. 409,017, 409,019; 409,020; 409,021 and 409,022, filed concurrently herewith and assigned to the same assignee as the present invention. More specifically, the compositions of this invention may be used in the form of mixtures with condensation products of preformed substituted or unsubstituted mono-, di-, or tri-(carbamidomethyl) amines and aldehydes, or condensation products of substituted or unsubstituted mono- or di-(monocarbinolureidomethyl) amines, or with two or more of such condensation products. They may be used in the production of wire or baking enamels, for bonding or cementing together mica flakes to form a laminated mica article, for bonding together abrasive grains in the production of resin-bonded abrasive articles such for instance as grindstones, sandpapers, etc., in the manufacture of electrical resistors, etc. They also may be employed for treating cotton, linen, and other cellulosic materials in sheet or other form. They also may be used as impregnants for electrical coils and for other electrically insulating applications.

What I claim as new and desire to secure by Letters Patent of the United States is:

1. A composition of matter comprising the reaction product of (1) an organic compound of the formula

N(CHR—NR'—CY—NR'—CHROH)₃ wherein Y is a member of the class consisting of oxygen and sulphur, R is a member of the class consisting of hydrogen and monovalent hydrocarbon radicals of not more than six carbon atoms, and at least one R' is hydrogen and the others are members of the class consisting of hydrogen, monovalent hydrocarbon radicals, and halogeno-substituted hydrocarbon radicals and (2) a reaction product of an aldehyde and a cyclic amidine containing at least one active hydrogen attached to the amino nitrogen.

2. A product comprising the heat-cured composition of claim 1.

3. A composition of matter comprising the reaction product of (1) an organic compound of the formula

N(CHR—NR'—CY—NR'—CHROH)₃ wherein Y is a member of the class consisting of oxygen and sulphur, R is a member of the class consisting of hydrogen and monovalent hydrocarbon radicals of not more than six carbon atoms, and at least one R' is hydrogen and the others are members of the class consisting of hydrogen, monovalent hydrocarbon radicals, and halogeno-substituted hydrocarbon radicals and (2) a reaction product of an aldehyde and melamine.

GAETANO F. D'ALELIO.

CERTIFICATE OF CORRECTION.

Patent No. 2,339,768.                                January 25, 1944.

GAETANO F. D'ALELIO.

It is hereby certified that error appears in the printed specification of the above numbered patent requiring correction as follows: Page 2, first column, line 40, for "dichoracetic" read --dichloracetic--; and second column, line 35, for "propalolamine" read --propanolamine--; line 67-68, for "cyanahydrin" read --cyanohydrin--; page 4, second column, line 8, for "substantialy" read --substantially--; and that the said Letters Patent should be read with this correction therein that the same may conform to the record of the case in the Patent Office.

Signed and sealed this 18th day of April, A. D. 1944.

(Seal)
                Leslie Frazer
             Acting Commissioner of Patents.